2,717,889
Patented Sept. 13, 1955

2,717,889
POLYMERIZATION OF ETHYLENE WITH A NICKEL-OXIDE AND METAL BOROHYDRIDE CATALYST

Morris Feller, Park Forest, and Edmund Field, Chicago, Ill., assignors to Standard Oil Company, Chicago, Ill., a corporation of Indiana No Drawing. Application July 22, 1954,
Serial No. 445,206

19 Claims. (Cl. 260—94.9)

This invention relates to a novel catalytic polymerization process. In one specific aspect, this invention relates to a novel process for the polymerization of ethylene in the presence of certain reactive metal borohydrides and a catalyst comprising essentially nickel oxide in combination with an active carbon, such as an active coconut charcoal.

One object of our invention is to provide novel and highly useful catalytic mixtures for the preparation of high molecular weight polymers from ethylene-containing gas mixtures. Another object is to provide a relatively low-temperature, low-pressure process for the polymerization or interpolymerization of ethylene in substantial yields to form high molecular weight normally solid polymeric materials having molecular weights ranging upwardly from 300.

Another object is to provide a novel process for the polymerization of ethylene to high molecular weight normally solid polymers. Still another object of our invention is to provide a novel process for the conversion of gas mixtures comprising essentially ethylene to high molecular weight solid resinous or plastic materials.

A further object is to provide a relatively low temperature, low pressure process for the conversion of ethylene-containing gases to high molecular weight resinous or plastic materials. A further object is to provide novel and highly efficient promoters or co-catalysts for nickel oxide-activated carbon polymerization catalysts.

In accordance with this invention, ethylene is converted principally to high molecular weight, normally solid polymers by contact with a catalytic mixture prepared by admixing one or more of certain reactive metal borohydrides with a solid catalyst comprising essentially nickel oxide supported upon an activated carbon, such as activated coconut charcoal. The reactive metal borohydrides employed herein are those which react with water at the polymerization temperatures to yield hydrogen. The polymerization process is carried out at temperatures between about 25° C. and about 250° C., preferably between about 100° C. and about 150° C. The polymerization is conducted at pressures which may range from about atmospheric pressure to about 15,000 p. s. i. or even more, but is usually effected at pressures between about 200 and about 5000 p. s. i., or most often at about 1000 p. s. i. The pressure within the polymerization zone is due almost entirely to the pressure of the ethylene feed stock. The normally solid materials produced by the catalytic polymerization tend to accumulate upon and within the solid catalyst. It is, therefore, desirable to supply to the polymerization zone a liquid or liquefiable medium which serves both as a reaction medium and as a solvent for the solid polymerization products. Suitable liquid reaction media for ethylene polymerization include various hydrocarbons, such as liquid saturated hydrocarbons or an aromatic hydrocarbon such as benzene, toluene or xylenes. The conversion of ethylene can be effected in the absence of a liquid reaction medium and the catalyst containing accumulated solid polymers can be treated from time to time, within or outside the polymerization zone, to effect removal of polymerization products therefrom and, if necessary, reactivation or regeneration of the catalyst for further use.

The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700, wax-like ethylene homopolymers having an approximate specific viscosity ($\times 10^5$) between about 1000 and 10,000 and tough, resinous ethylene homopolymers having an approximate specific viscosity ($\times 10^5$) of 10,000 to more than 300,000 [($\eta$ relative $-1)\times 10^5$]. By the term "tough, resinous polyethylene" as used herein, we mean polymer having a brittle point below $-50°$ C. (A. S. T. M. Method D746–51T), impact strength greater than two foot pounds per inch of notch (A. S. T. M. Method D256–47T—Izod machine) and minimum elongation at room temperature (25° C.) of 100%.

The reactive metal borohydrides which are employed in the present process are all characterized by the fact that they react with water under the polymerization conditions to yield hydrogen. The reaction of some of the metal borohydrides with water is sometimes rapid or substantially instantaneous. It appears that with the very reactive metal borohydrides, the rate of reaction with water is limited principally by the rate of contacting. While sodium borohydride decomposes only slowly and slightly in cold water, its rate of reaction therewith to form hydrogen increases with increasing temperature of the solution. Suitable borohydrides are, for example, those of the alkali metals, especially sodium, lithium and potassium. The borohydrides of magnesium, beryllium, aluminum, thorium, hafnium, zirconium and uranium can also be employed. These reactive borohydrides are characterized, also, by their ability to reduce polyvalent metal salts, for example, by their ability to reduce Ti in TiCl$_4$ to the $+3$ valence state.

The employment of a reactive metal borohydride in the reaction zone has numerous important practical consequences, as compared to processes wherein the nickel oxide-carbon catalysts are employed alone. Thus, in the presence of the reactive metal borohydride and said nickel catalyst, high yields of solid polymers can be obtained, the catalysts can function well in the presence of large proportions of liquid reaction medium, the catalysts retain strong polymerization activity for a long period of time (long catalyst life), polymers having desirable ranges of physical and chemical properties can be readily produced by controlling the reaction variables, etc., as will appear from the detailed description and operating examples which follow.

The proportion of reactive metal borohydride employed may be varied between about 0.05 to about 2.5 (preferably about 0.5 to about 1.0) parts by weight per part by weight of the nickel oxide-carbon catalyst (total weight of the nickel catalyst). The optimum proportions can readily be determined in specific instances, by simple small-scale tests with the specific feed stocks, liquid reaction medium, reaction medium: catalyst ratio, catalyst, specific metal borohydride, temperature, pressure and nature of the product which is desired. Usually LiBH$_4$ is employed in proportions between about 0.5 and about 1 part by weight per part by weight of nickel catalyst at ratios between about 5 and about 2000 volumes of liquid medium per part by weight of the nickel catalyst. Sodium borohydride is usually employed in the proportion of at least about 0.5 part by weight per part by weight of the nickel catalyst.

The nickel component of the catalyst is extended upon a major proportion of an activated carbon. Thus, we can employ activated charcoals derived from cellulosic materials, particularly coconut, having surface areas between about 700 and about 1200 square meters per gram, pore volumes of about 0.53 to 0.58 cc. per gram and pore diameters of about 20 to 30 Å, and, in some instances, small amounts of combined oxygen. The activated charcoal or other carbon support may be pretreated with nitric acid before use as a catalyst support in order to remove basic materials, for example, as described in E. F. Peters application for United States Letters Patent, Serial No. 164,825, filed May 27, 1950, now U. S. Patent No. 2,692,295.

The preparation of nickel catalysts supported upon activated carbon, particularly coconut charcoal, is well known in the art and the preparative methods form no part of the present invention. Usually we prefer to prepare the catalyst by a cheap, simple and efficacious technique, which is described briefly hereinafter.

A suitable method of catalyst preparation involves adsorbing nickel nitrate from an aqueous solution upon a porous active carbon such as a suitable charcoal in an amount sufficient to produce the desired nickel content in the finished catalyst. The charcoal containing adsorbed nickel salt is then treated thermally at temperatures between about 200 and about 350° C. to effect decomposition of nickel nitrate to form nickel oxide, suitably by heating under a partial vacuum such as 1 to 20 mm. of mercury (absolute pressure) or in the presence of steam or by the application of heat, vacuum and steam, as is known in the art. The resultant catalyst comprises principally nickel oxide extended upon charcoal.

Although the nickel catalyst may contain between about 0.1 and about 20 weight per cent of nickel (calculated as metallic nickel), we usually employ catalyst containing between about 3 and about 10 weight per cent of nickel.

The activated carbon support seems to play a unique role in the catalyst. Other supports which might be considered prima facie equivalents, greatly reduce or virtualy destroy the power of the catalyst to produce solid polymers from ethylene, viz. alumina and silica supports such as kieselguhr.

If it is desired to employ the nickel catalyst in the form of pellets large enough to be retained on a 20-mesh sieve or at least about 0.1 inch in the largest dimension, it is desirable to pellet the nickel catalyst with between about 50 and about 95 weight percent, based on the total weight of the pellet, of a difficulty reducible metal oxide filler material such as alumina, titania, zirconia or silica.

The nickel catalyst can be employed in various forms and sizes, e. g., as powder, granules, microspheres, broken filter cake, lumps, or shaped pellets. A convenient form in which the catalysts may be employed is as granules of about 20–100 mesh/inch size range.

Although ethylene may be polymerized to produce normally solid polymers in the presence of reactive metal borohydride-nickel oxide-charcoal catalysts even at room temperature, we prefer to employ temperatures between about 75° C. and about 150° C.

Reaction pressures may be varied within the range of about 15 p. s. i. to the maximum pressure which can economically be employed in suitable commercial equipment, for example up to as much as 30,000 p. s. i. A convenient pressure range for the manufacture of solid polymers by the use of the present catalysts is about 200 to about 10,000 p. s. i., which constitutes a distinct advantage over the commercial high pressure ethylene polymerization processes which apparently require operating pressures in the range of about 20,000 to about 50,000 p. s. i.

Ethylene charging stocks may contain inert hydrocarbons, as in refinery gas streams, for example, methane, ethane, propane, etc. However, it is preferred to employ as pure and concentrated ethylene charging stocks as it is possible to obtain. It is desirable to minimize or avoid the introduction of oxygen, carbon dioxide, water or sulfur compounds into contact with the catalyst.

The contact time or space velocity employed in the polymerization process will be selected with reference to the other variables, catalysts, the specific type of product desired and the extent of ethylene conversion desired in any given run or pass over the catalyst. In general, this variable is readily adjustable to obtain the desired results. In operations in which the ethylene charging stock is caused to flow continuously into and out of contact with the solid catalyst, suitable liquid hourly space velocities are usually selected between about 0.1 and about 10 volumes, preferably about 0.5 to 5 or about 2 volumes of olefin solution in a liquid reaction medium, which is usually an aromatic hydrocarbon such as benzene or xylenes; tetralin or other cycloaliphatic hydrocarbon, such as cyclohexane or decalin (decahydronaphthalene).

The amount of ethylene in such solution may be in the range of about 2 to 50% by weight, preferably about 2 to about 10 weight percent or, for example, about 5 to 10 weight percent. When the ethylene concentration in the liquid reaction medium is decreased below about 2 weight percent, the molecular weight and melt viscosity of the polymeric products tend to drop sharply. In general, the rate of ethylene polymerization tends to increase with increasing concentration of the ethylene in the liquid reaction medium. However, the rate of ethylene polymerization to form high molecular weight, normally solid polymers is preferably not such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, solutions of ethylene polymer above 5–10% in the reaction medium become very viscous and difficult to handle and severe cracking or spalling of the catalyst particles or fragments may occur, resulting in catalyst carry-over as fines with the solution of polymerization products and extensive loss of catalyst from the reactor.

In batch operations, operating periods between one-half and about 20 hours are employed and the reaction autoclave is charged with ethylene as the pressure falls as a result of the olefin conversion reaction.

Ethylene can be polymerized in the gas phase and in the absence of a liquid reaction medium by contact with the catalyst. Upon completion of the desired polymerization reaction it is then possible to treat the catalyst for the recovery of the solid polymerization products, for example by extraction with suitable solvents. However, in the interests of obtaining increased rates of olefin conversion and of continuously removing solid conversion products from the catalyst, it is much preferred to effect the conversion of the olefin in the presence of suitable liquid reaction media. The liquid reaction medium may also be employed as a means of contacting the olefin with catalyst by preparing a solution of the olefin feed stock in the liquid reaction medium and contacting the resultant solution with the polymerization catalyst.

The liquid reaction medium functions as a solvent to remove some of the normally solid product from the catalyst surface.

Various classes of hydrocarbons or their mixtures which are liquid under the polymerization conditions of the present process can be employed. Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene can also be employed.

In addition, we may employ such aromatic hydrocarbons as ethylbenzene, isopropylbenzene, secbutylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, we may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-pentane, n-hexane, 2,3-dimethylbutane, n-octane, isooctane (2,2,4-trimethylpentane), n-decane, n-dodecane, cyclohexane, methylcyclohexane, dimethylcyclopentane, ethylcyclohexane, decalin, methyldecalins, dimethyldecalins and the like.

We may also employ a liquid hydrocarbon reaction medium comprising liquid olefins, e. g., n-hexenes, cyclohexene, octenes, hexadecenes and the like.

The normally solid polymerization products which are retained on the catalyst surface or grease-like ethylene polymers may themselves function to some extent as a liquefied hydrocarbon reaction medium, but it is highly desirable to add a viscosity-reducing hydrocarbon, such as those mentioned above, thereto in the reaction zone.

The liquid hydrocarbon reaction medium should be freed of poisons before use in the present invention by acid treatment, e. g., with anhydrous p-toluenesulfonic acid, sulfuric acid, or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

We have purified C. P. xylenes by refluxing with a mixture of 8 weight percent $MoO_3$ on $Al_2O_3$ catalyst and $LiAlH_4$ (50 cc. xylene—1 g. catalyst—0.2 g. $LiAlH_4$) at atmospheric pressure, followed by distillation of the xylenes. Still more effective purification of solvent can be achieved by heating it to about 225–250° C. with either sodium and hydrogen or NaH plus 8 weight percent $MoO_3$—$Al_2O_3$ catalyst in a pressure vessel.

Temperature control during the course of the polymerization process can be readily accomplished owing to the presence in the reaction zone of a large liquid mass having relatively high heat capacity. The liquid hydrocarbon reaction medium can be cooled by heat exchange inside or outside the reaction zone.

When solvents such as xylenes are employed alkylation thereof by ethylene can occur under the reaction conditions. The alkylate is removed with grease in the present process, can be separated therefrom by fractional distillation and can, if desired, be returned to the polymerization zone.

The following specific examples are introduced in order to illustrate but not unduly to limit our invention. The exemplary operations were effected in 250 cc. capacity stainless steel pressure vessels provided with a magnetically-actuated stirring device which was reciprocated through the liquid in the vessel in order to obtain good contacting of the ethylene and catalyst components.

*Example 1*

The autoclave was charged with 100 cc. of dehydrated and decarbonated toluene which was freshly distilled, 1 g. of sodium borohydride and 1 g. of the nickel catalyst. This catalyst was prepared by evaporating a 10% nickel nitrate solution while stirring an activated coconut charcoal, 8–14 mesh per inch, until all the nickel nitrate was deposited on the support. The catalyst was dried at 110° C. and then heated in steam at atmospheric pressure while the temperature was gradually raised from 100° C. to 290 C. Decomposition of the nickel nitrate on the charcoal occurred to form a catalyst comprising essentially NiO on charcoal. The nickel catalyst contained 5 weight percent of nickel. The contents of the autoclave were heated with stirring to 129° C. and ethylene was then injected to a partial pressure of 885 p. s. i. Reaction was continued for 21 hours. Upon conclusion of the reaction the reactor contents were cooled to room temperature, the pressure was vented to atmospheric pressure and the nickel catalyst containing adsorbed polyethylenes was removed and extracted with hot xylenes. The hot xylenes solution was cooled to room temperature to precipitate a tough, resinous ethylene polymer which was filtered and the filtrate was evaporated to leave a grease-like solid polyethylene residue. The reaction yielded 1.12 grams per gram of the nickel catalyst of a solid polymer of ethylene having a specific gravity (24/4° C.) of 0.946 and melt viscosity of $2.4 \times 10^5$ (method of Dienes and Klemm, J. Appl. Phys. 17, 458–71 (1946)). The yield of solid grease-like polyethylenes was 2.1 g. per g. of the nickel catalyst.

In sharp contrast to the above results are the results which were obtained in the following experiment in which no promoter was employed. The charge to the reactor was the same as in the above example but no promoter was included and it was found that the yield of solid polyethylenes was only 0.01 g. per g. and the yield of solid grease-like polyethylenes was only 0.05 g. per g. of the solid catalyst. The reaction period was 20 hours.

In another control run the reactor was charged with 100 cc. of the purified toluene, 2 g. of the 5% nickel oxide-charcoal catalyst, heated with stirring to 131° C. and then pressured with ethylene to a partial pressure of 910 p. s. i. The operation period was 20.5 hours. The reaction yielded only a trace of solid polyethylenes and 0.25 cc. of a liquid polymer per gram of the nickel catalyst.

*Example 2*

The autoclave was charged with 100 cc. of purified toluene as in Example 1, 1 g. of lithium borohydride and 1 g. of nickel catalyst having the same composition and prepared by the same method as the nickel catalyst of Example 1. The contents of the reactor were heated with stirring to 127° C. and ethylene was then introduced to a partial pressure of 775 p. s. i. Reaction was continued for 21.5 hours. The reaction products were worked up as in Example 1. The yield of solid polyethylenes was 5.85 g. per g. of the nickel catalyst and the yield of grease-like polyethylenes was 2.4 g. per g. of the nickel catalyst.

*Example 3*

The process of Example 1 is repeated but potassium borohydride is substituted in equal parts by weight for sodium borohydride. The reaction products are worked up as before to separate solid polyethylenes.

In large scale operations the flow-scheme shown in the E. Field and M. Feller application, Serial No. 324,608, filed December 6, 1952, may be employed.

The polymers produced by the process of this invention can be subjected to such after-treatment as may be desired, to fit them for particular uses or to impart desired properties. Thus, the polymers can be extruded, mechanically milled, filmed or cast, or converted to sponges or lattices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, binders, etc.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and about 1 percent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products can be employed in small proportions to substantially increase the viscosity of fluent liquid hydrocarbon oils and as gelling agents for such oils.

The polymers produced by the present process can be subjected to chemical modifying treatments, such as halogenation, halogenation followed by dehalogenation, sulfohalogenation by treatment with sulfuryl chloride or a mixture of sulfur dioxide and chlorine, sulfonation, and other reactions to which hydrocarbons may be subjected.

Having thus described our invention, what we claim is:

1. In a process for the preparation of a normally solid hydrocarbon material, the steps which comprise contacting ethylene with a catalytic mixture prepared by admixing a metal borohydride which is capable of reacting with water at the polymerization temperature to produce hydrogen and with a catalyst comprising essentially nickel oxide supported upon an activated carbon, effecting said contacting at an effective polymerization temperature between about 25° C. and about 250° C., and recovering a normally solid hydrocarbon material thus produced.

2. In a process for the preparation of a normally solid hydrocarbon material, the steps which comprise contacting ethylene with a catalytic mixture prepared by admixing a metal borohydride which is capable of reacting with water at the polymerization temperature to produce hydrogen and with a catalyst comprising essentially nickel oxide in a proportion between about 0.1 and about 20 weight percent, calculated as elemental nickel, supported upon an activated carbon, effecting said contacting in the presence of a liquid hydrocarbon reaction medium at an effective polymerization temperature between about 25° C. and about 250° C., and recovering a normally solid hydrocarbon material thus produced.

3. The process of claim 1 wherein said metal borohydride is an alkali metal borohydride.

4. The process of claim 2 wherein said metal borohydride is an alkali metal borohydride.

5. The process of claim 2 wherein said metal borohydride is sodium borohydride.

6. The process of claim 2 wherein said metal borohydride is lithium borohydride.

7. The process of claim 2 wherein said metal borohydride is potassium borohydride.

8. The process of claim 2 wherein said metal borohydride is aluminum borohydride.

9. The process of claim 2 wherein said metal borohydride is magnesium borohydride.

10. A process for the production of a normally solid hydrocarbon material, which process comprises contacting ethylene and a liquid hydrocarbon reaction medium at an effective polymerization temperature between about 25° C. and about 250° C. with a catalytic mixture prepared by admixing a metal borohydride which is capable of reacting with water at the polymerization temperature to produce hydrogen and a catalyst comprising essentially nickel oxide in a proportion between about 0.1 and about 20 weight percent, calculated as elemental nickel, supported upon an activated coconut charcoal, the weight ratio of said borohydride to said nickel oxide-containing catalyst being between about 0.05 and about 2.5, and recovering a normally solid hydrocarbon material thus produced.

11. The process of claim 10 wherein the polymerization temperature is between about 100° C. and about 150° C.

12. The process of claim 10 wherein said liquid hydrocarbon reaction medium is a monocyclic aromatic hydrocarbon.

13. The process of claim 10 wherein said liquid hydrocarbon reaction medium is a saturated hydrocarbon.

14. The process of claim 10 wherein said metal borohydride is an alkali metal borohydride.

15. The process of claim 10 wherein said metal borohydride is sodium borohydride.

16. The process of claim 10 wherein said metal borohydride is lithium borohydride.

17. The process of claim 10 wherein said metal borohydride is potassium borohydride.

18. The process of claim 10 wherein said metal borohydride is aluminum borohydride.

19. The process of claim 10 wherein said metal borohydride is magnesium borohydride.

No references cited.